Oct. 18, 1927.
H. A. TUTTLE
1,646,125
CLUTCH MECHANISM
Filed March 15, 1923
3 Sheets-Sheet 1
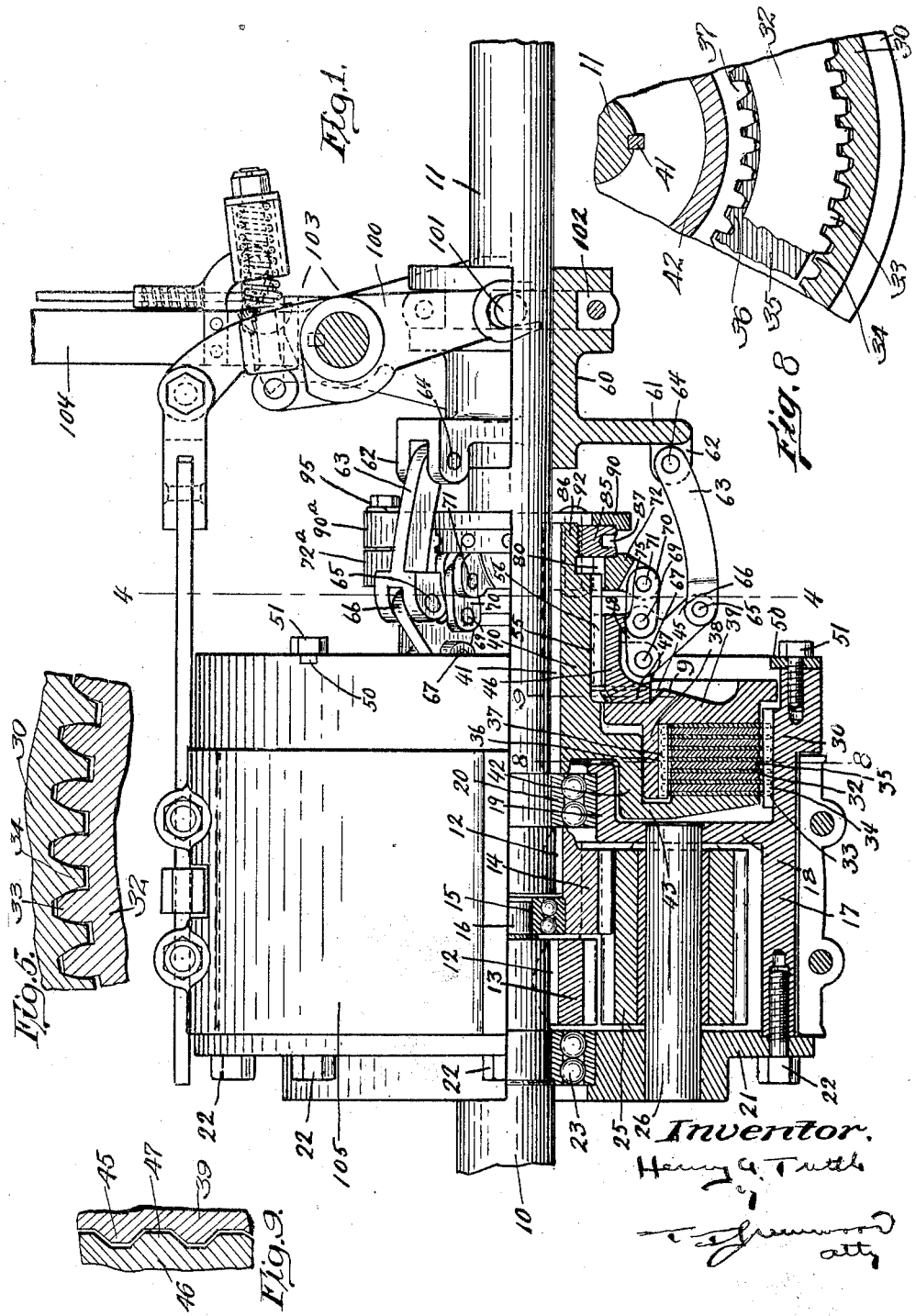

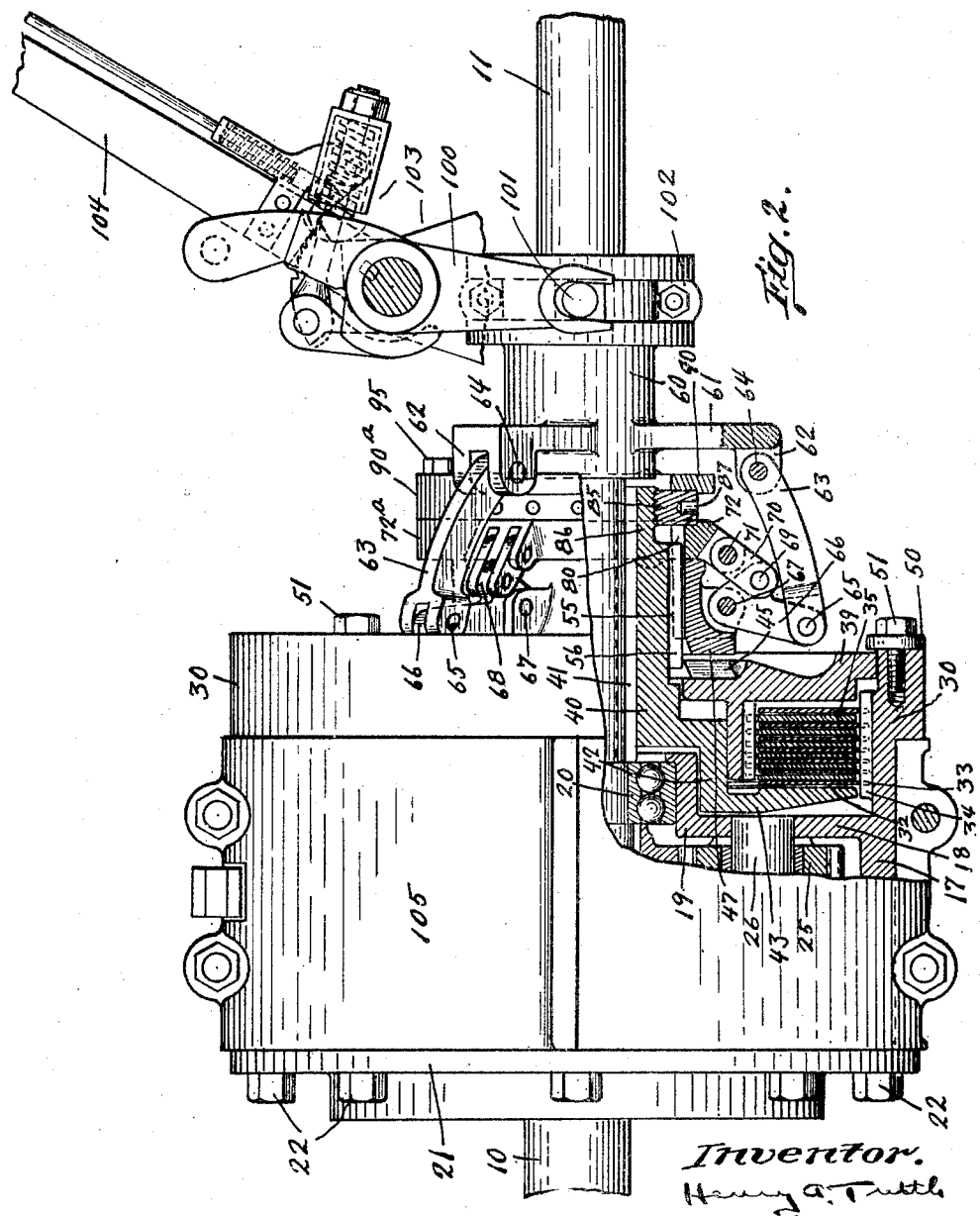

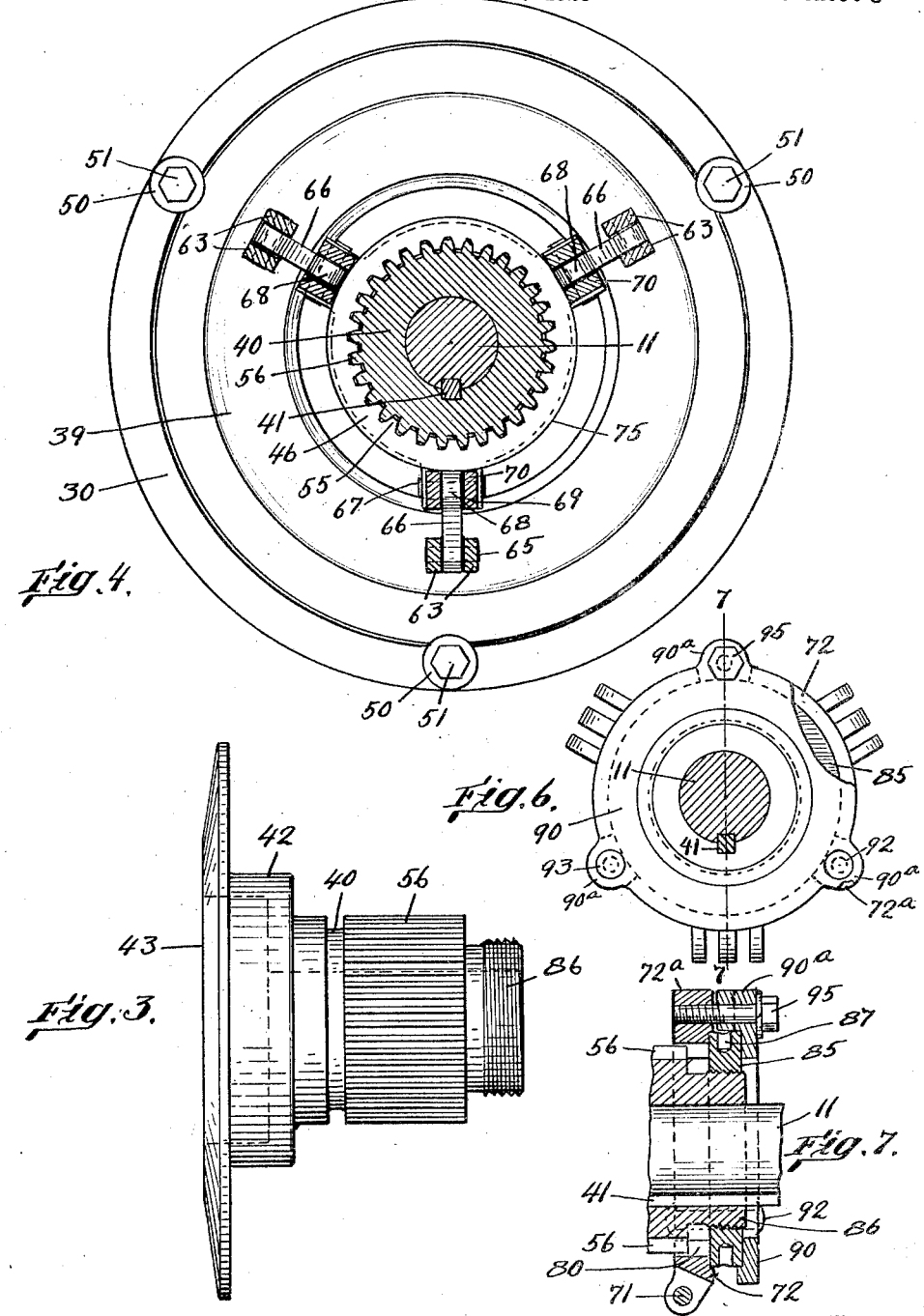

Patented Oct. 18, 1927.

1,646,125

UNITED STATES PATENT OFFICE.

HENRY A. TUTTLE, OF UPTON, MASSACHUSETTS.

CLUTCH MECHANISM.

Application filed March 15, 1923. Serial No. 625,383.

This invention relates to clutch mechanism especially adapted for use in connection with reversing gearing of the type in which two shafts, as a driving shaft and a driven shaft, are adapted to be connected by means, as gearing, for reverse drive, and adapted to be connected by means, as a clutch mechanism, for forward drive, and is intended as an improvement to my Patent No. 1,392,984, dated October 11, 1921.

The reversing gearing herein illustrated comprises gears secured to the proximate ends of the driving and driven shafts, and in mesh with pinions supported by a carrier in the form of a casing, which may enclose them, and a brake-mechanism is associated therewith to secure reverse drive, adapted to restrain the casing against rotation whereby the driving shaft will operate through the gear secured thereon, to rotate the pinions thus maintained against rotation about said shaft, to reversely rotate the driven shaft.

The clutch-mechanism employed to secure forward drive may comprise a clutch member secured to one of said shafts, as the driven shaft, against relative rotation with respect thereto; and adapted to engage a clutch member secured to the casing against relative rotation with respect thereto, and the engagement of said two clutch members serves to lock said casing to the shaft against independent relative rotation with respect thereto and thereby serves to lock both shafts through the pinions carried by the casing, for simultaneous forward rotation.

Said clutch-mechanism may also comprise a plurality of clutch plates, certain of which are secured in slidable, but against rotative, engagement with said casing, and others of which are secured in slidable but against rotative engagement with a clutch plate carrier adapted to be connected for rotation with one of said shafts, as the driven shaft, and a movement of the clutch plate carrier toward the casing causes the engagement of the clutch plates and thereby locks the casing and shaft against relative rotation.

The clutch-mechanism includes operating mechanism which may comprise link and lever mechanism and means arranged to connect the clutch plate carrier positively to the driven shaft and apply pressure to the two sets of clutch plates, to effect the engagement of the clutch for forward rotation of the driven shaft, and release the clutching pressure and disconnect the clutch plate carrier from the driven shaft for neutral and reverse rotation of the driven shaft, and in the disconnected condition of the clutch plate carrier, it is free from direct driving connection with any rotating part of the reversing gearing.

In my above mentioned patent, the driven shaft has an externally screw-threaded portion, and the pressure-adjusting ring of the link and lever mechanism of the clutch operating mechanism is mounted thereon and is adjustable along the length of the shaft for proper clutching pressure and to compensate for wear in the clutch plates; and the clutching pressure is exerted against and resisted by a wall of the casing; and the clutching action tends to move the casing axially.

An object of this invention is to provide means by which the clutching pressure is balanced whereby to obviate the tendency toward axial movement of a gearing element, and for this purpose the driving and driven clutch plates may be disposed and adapted to be compressed into clutching relation by means carried by the same rotatable element of the gearing, as the driven shaft; and said means may include a member fixed to the driven shaft against rotation and also against axial movement thereon, and adapted to receive and support the clutch plates against axial movement due to the pressure effecting the clutching engagement of said plates. Said means may also include the clutch plate carrier and operating mechanism also connected with said fixed member and adapted to exert a thrust against it in a direction opposite to that of the clutch engaging pressure, whereby both pressures are balanced and said fixed member, and the driven shaft connected therewith, are without axial movement during clutch actuation.

In my above-mentioned patent, the clutch operating mechanism includes a jaw clutch-member adapted to connect the clutch plate carrier positively with the driven shaft, and said jaw clutch-member is mounted on the driven shaft for conjoint rotation therewith and for axial movement thereon.

It is an object of this invention to mount said jaw clutch-member slidably on the pressure member above mentioned and fix it for conjoint rotation therewith.

A further object is to provide novel means comprising intermeshing external or spur gear teeth carried by the pressure member and internal gear teeth carried by the jaw clutch-member for connecting said pressure and clutch members; and said means admits of the jaw clutch member sliding easily on the pressure member and provides relatively great strength to transmit the driving torque between the driving and driven shafts through the clutch plates.

A further object is to provide improved means to lock the clutch-pressure adjusting ring positively in adjusted position and to the pressure member.

A further object is generally to improve the construction and operation of clutch mechanisms.

Fig. 1 is an elevation, partly in section, of a reversing gearing embodying my invention, with the clutch mechanism set for forward drive.

Fig. 2 is a view similar to Fig. 1 but with the clutch-mechanism disengaged and the gearing set for reverse drive.

Fig. 3 is an elevation of the pressure member.

Fig. 4 is a section along line 4—4 of Fig. 1.

Fig. 5 is an enlarged detail of the intermeshing spur and internal gear teeth of the pressure member and jaw clutch-member.

Fig. 6 is an end detail of the locking means for the clutch-pressure adjusting ring.

Fig. 7 is a sectional view along line 7—7 of Fig. 6.

Fig. 8 is a sectional detail along line 8—8 of Fig. 1.

Fig. 9 is a sectional detail along line 9—9 of Fig. 1.

As here shown, the reversing gearing comprises the driving shaft 10 and the driven shaft 11, the proximate ends of which may terminate within the gearing casing and have secured thereto, by keys 12, the spur gears 13 and 14. A ball bearing 15 is or may be disposed in the end of the bore of said gear 14, and the driving shaft 10 formed with a reduced end-portion 16 which fits within said bearing, whereby the two shafts are held in axial alignment.

The reversing gearing casing includes the cylindrically-shaped, or drum, member 17 which has a radially inwardly extended wall 18 intermediate its length, and said wall is formed with a concentric hub 19 which is internally recessed and a ball bearing 20 is received in said recess which forms a bearing for the gearing casing on the driven shaft 11. The gearing casing is also provided with a cover plate 21 which is or may be secured to the end of the casing by the bolts 22 and forms an end wall of the casing. Said plate 21 is concentrically recessed and a ball bearing 23 is received in said recess and forms a bearing support for the casing on the driving shaft 10.

The spur gears 13 and 14 which are secured respectively to the driving and driven shafts 10 and 11 are or may be of different diameters, whereby a difference of speed of said shafts may be obtained when the gearing is operating for reverse drive. The spur gear 14 secured to the driven shaft 11 is here shown as the larger of the two gears and is in mesh with sets of pinions 25, which are revolubly mounted on pins 26, secured in the walls 18 and 21 of the gearing casing; and said pinions 25 are made long enough to mesh with large pinions not shown, which are similarly carried by the gearing casing; and said latter pinions are in mesh with the spur gear 13 secured to the driving shaft 10.

Said arrangement provides planetary gearing elements connected respectively with the driving and driven shafts by which reverse drive is secured for, when the gearing casing, and consequently the pinions are restrained from revolving, said driving shaft 10 transmits a rotary movement through the spur gear 13 and meshing pinions to the spur gear 14 of the driven shaft and rotates said shaft in a direction reversed from the direction of rotation of the driving shaft.

While the form of gearing herein described is desirable, especially for transmitting large powers and high speed on reverse drive, yet other reverse drive mechanisms may be employed.

The clutch-mechanism which is associated with the reverse-drive mechanism, by means of which the driving shaft 10 and driven shaft 11 may be connected for forward drive, is disposed within the extension 30 of the cylindrical wall 17 of the casing and beyond the radial wall 18 of the casing.

Said clutch-mechanism includes two sets of clutch plates and carrying elements therefor, at least one of which is movable axially to cause the engagement of said plates for actuation and engagement of the clutch. The clutch plates of one set, as 32, have their outer edges of spur gear-tooth formation, as 33, adapting them to enter the interdental spaces and slidably engage internal gear teeth 34 formed on the internal face of the wall 30 of the gearing casing, which serves as means for connecting the plates 32 to the casing against independent rotation and also provides means whereby said plates may be moved axially with respect to the casing, in an actuation of the clutch into engaged or disengaged condition.

The clutch plates of the other set, as 35, have their inner peripheries of internal gear tooth formation, as 36, adapting them for relative sliding engagement with spur gear teeth 37 on a hub 38 which is extended from an annular disc 39 and which serves as the carrying element for said set of plates. Said teeth 37 form means connecting said plates 36 to the carrying element against independent rotation with respect thereto and at the same time provide means whereby said plates may be moved axially in an actuation of the clutch.

In accordance with this invention, I provide a hub 40 which is fixed to the driven shaft 11 against both axial movement therealong and independent rotation thereon by suitable means as the key 41. Said hub is formed or provided with an enlarged hub-portion 42 at its inner end adapted to support the hub 38 of the carrier element for the clutch plates 35. An annular flange 43 extends outwardly from the inner end of said enlarged hub 42 and serves as a pressure member adapted to support the sets of clutch plates against the pressure caused by the axial movement of the carrier element in actuating the clutch.

The outer face of the flange 39 of the carrier element is formed or provided with a plurality of teeth 45, Fig. 9, formed with tapered side walls, and a thrust ring 46 of the clutch operating mechanism is formed with corresponding teeth 47 adapted to enter the interdental spaces of said flange 39 and engage said teeth 45 to move the carrier element axially and effect the actuation of the clutch. When the thrust ring is withdrawn to a position clear of the teeth 45 of the carrier element, Fig. 2, the clutch is disengaged and the carrier element and the set of clutch plates carried thereby is free from positive driving engagement with a rotatable part of the reversing gearing. With this arrangement, both sets of clutch plates may be without relative rotation in the neutral or reverse drive conditions of the gearing. The coacting teeth on the carrier element and thrust ring form elements of a jaw-clutch by which the carrier element is connected positively with or disconnected from driving engagement with the driven shaft.

The axial movement of the carrier element outwardly, or toward clutch-disengaged position, is restricted by the stop-members 50 secured to the wall 30 by the bolts 51 and which project inwardly into the path of axial movement of said carrier element.

In accordance with this invention, the thrust ring 46 is mounted for axial movement and against independent rotation on the hub 40; and for this purpose, said thrust ring is formed with the internal gear teeth 55 which mesh with the spur gear teeth 56 formed upon said hub 40. Said intermeshing teeth 55 and 56 form means for connecting said thrust ring 46 to the hub 40 against independent rotation with respect thereto to transmit the driving torque from the driving shaft, and at the same time provide means whereby the thrust ring 46 may be moved axially on the hub 40 to actuate the clutch.

The pitch diameter of the internal gear teeth is adapted to be slightly greater than the pitch diameter of the spur gear teeth whereby suitable clearance between the teeth is provided to permit a relative sliding movement therebetween.

By reason of the gear tooth formation of the connection between the thrust ring and hub, a strong driving connection therebetween is provided and yet the thrust ring may be easily moved axially on the hub; and the gear tooth connection may be cheaply and accurately constructed.

The operating mechanism for the clutch mechanism includes the sleeve 60 which is slidably mounted and rotatably free on the driven shaft 11. Said sleeve 60 is formed or is provided with an outstanding flange 61 which is provided with the ears 62. Links 63 have similar ends thereof disposed between said ears and pivoted to pins 64 fixed in said ears. The other ends of said links are pivoted, by pins 65, to the arms 66 of bell-crank levers, and said bell-crank levers are pivotally connected by pins 67 to the thrust ring 46. The other arms 68 of said bell-crank levers are pivotally connected by pins 69 to pairs of links 70, and said links 70 are pivoted on pins 71 carried by the ring 72. Said ring 72 is adapted to be secured in fixed position on the hub 40 secured to the driven shaft 11, by means hereinafter to be described. Said arms 68 of the bell-crank levers and said pairs of links 70 constitute toggle members and when said sleeve 60 is moved axially on the driven shaft 11 toward the right, Fig. 1, said toggles are straightened and operate to force the thrust ring 46 into driving engagement with the carrier element and move the carrier element axially on the enlarged hub portion 42 of the hub 40 to actuate the clutch. A movement of the sleeve 60 in the reverse direction serves to break the toggles and effect the disengagement of the clutch and also the disengagement of the thrust ring 46 from the carrier element.

Said thrust ring 46 is formed with an outstanding annular flange 75, or equivalent adapted to be engaged by the arms 68 of the bell-crank levers to hold the toggle members in a slightly over-shot position whereby to hold the clutch in engagement against the clutching pressure and driving torque transmitted to the thrust ring through the teeth 45 of the carrier element and teeth 47 of the thrust ring.

Said ring 72, with which the links 70 of the operating mechanism are connected, in accordance with this invention is connected with the hub 40 against independent rotation with respect thereto, and for axial movement thereon in a manner similar to the connection of the thrust ring 46 with said hub. Said ring 72 is formed with the internal gear teeth 80 which mesh with the spur gear teeth 56 of said hub 40 and form connecting means by which said ring 72 is positively restrained from independent rotation but is free for axial movement thereon.

Means are provided to adjust the link and lever operating mechanism to exert a suitable clutching pressure upon the clutch mechanism, and to take up wear in the clutch components due to extensive use. Said means includes an adjusting nut in the form of a ring 85. Said ring is internally screw-threaded and, in accordance with this invention, the hub 40 has the reduced end-portion 86 which is externally screw-threaded; and said ring 85 is threaded thereon. Said ring may be formed with a plurality of recesses 87 in its periphery adapted to receive a spanner wrench or other suitable tool to rotate the ring on the hub. It is obvious that as said ring is advanced on said hub 40, the clutch operating mechanism will exert an increased pressure on the clutch in actuating it; and said ring forms an abutment carried by the hub 40 adapted to receive the thrust pressure of the operating mechanism.

Novel means are herein employed to lock the adjusting ring to the hub 40 in adjusted position. For this purpose a clamping ring 90 is disposed against the outer face of the adjusting ring and may have an annular recess in which the adjusting ring is rotatably received; and said ring 72, which also serves as a clamping ring, may have a similar recess in which the adjusting ring is rotatably received. Said rings 72 and 90 are formed with the three sets of lugs 72ª and 90ª respectively which are preferably equi-distantly spaced. Securing means, as the two rivets 92 and 93, are passed through two sets of lugs to hold said rings 72 and 90 together, and said rivets are so arranged that said rings are somewhat loosely held against the adjusting ring 85, so that said adjusting ring can be rotated to change the adjustment thereof. A clamping bolt 95 is passed through the remaining set of lugs and may be threaded in one of said lugs. When said bolt is tightened it serves to draw said rings 72 and 90 firmly against the adjusting ring 85 to clamp said ring 85 therebetween, said rings 72 and 90 pivoting about the rivets 92 and 93 for this purpose, and, as said ring 72 is restrained from rotation on the hub 40, said arrangement serves to lock the adjusting ring against rotation. A change of adjustment may be made by loosening the clamping bolt 95, which will release the adjusting ring for rotation on the hub 40.

Said sleeve 60 is moved axially on the driven shaft 11 by the forked arm 100 which engages a pin 101 carried by the collar 102 which is rotatably carried on said sleeve. Said arm is actuated by suitable mechanism 103, including the operating handle 104, and said mechanism also is arranged to control a brake band 105 disposed about the casing 17 to engage and hold said casing against rotation to secure reverse drive. Movement of the handle in one direction from neutral effects engagement of the clutch to secure forward drive and movement in the other direction from neutral effects engagement of the brake band with the casing 17 to secure reverse drive. Said mechanism is no part of the present invention and need not be described further.

I claim:

1. The combination of a driving shaft, a driven shaft, a casing associated with said driving shaft, and clutch mechanism adapted to connect said shafts for forward drive including clutch plates carried by said casing, an axially movable carrier element, other clutch plates carried by said carrier element, a member fixed to said driven shaft against axial movement thereon disposed to support said clutch plates against axial movement, and operating mechanism carried by said fixed member arranged to move said carrier element axially and actuate the clutch.

2. The combination of a driving shaft, a driven shaft, a casing associated with said driving shaft, and clutch mechanism adapted to connect said shafts for forward drive including clutch plates carried by said casing, a normally freely rotatable and axially movable carrier element, other clutch plates carried by said carrier element, a member fixed to said driven shaft against axial movement thereon disposed to support said clutch plates against axial movement, and operating mechanism carried by said fixed member arranged to connect said carrier element against independent rotation with respect to said fixed member and move said carrier element axially to actuate the clutch.

3. The combination of a driving shaft, a driven shaft, a casing associated with said driving shaft, and clutch mechanism adapted to connect said shafts for forward drive including clutch plates carried by said casing, an axially movable carrier element, other clutch plates carried by said carrier element, a member fixed to said driven shaft arranged to support said carrier element for axial movement thereon and said clutch plates against axial movement and operating mechanism carried by said fixed member arranged to move said carrier element axially on said fixed member to actuate the clutch.

4. The combination of a driving shaft, a driven shaft, a casing associated with said driving shaft, and clutch mechanism adapted to connect said shafts for forward drive including clutch plates carried by said casing, an axially movable carrier element, other clutch plates carried by said carrier element, a member fixed to said driven shaft arranged to support said clutch plates against axial movement, said carrier element supported on said fixed member for normally free rotation and axial movement thereon, and operating mechanism carried by said fixed member arranged to connect said carrier element against independent rotation with respect to said fixed member and move said carrier element axially to actuate the clutch.

5. The combination of a driving shaft, a driven shaft, a casing associated with said driving shaft, and clutch mechanism adapted to connect said shafts for forward drive including clutch plates carried by said casing, an axially movable carrier element, other clutch plates carried by said carrier element, a member fixed to said driven shaft arranged to support said carrier element for axial movement thereon and said clutch plates against axial movement and extended outwardly beyond said carrier element, and operating mechanism carried by said fixed member beyond said carrier element arranged to move said carrier element axially to actuate the clutch.

6. The combination of a driving shaft, a driven shaft, and clutch mechanism adapted to connect said shafts including clutch plates associated with the driving shaft, other clutch plates associated with the driven shaft, an axially movable carrier element carrying said latter clutch plates, a member fixed to said driven shaft having a hub extended loosely through and outwardly beyond said carrier element and an annular flange arranged to support said clutch plates against axial movement, clutch operating mechanism including a thrust member slidable axially and fixed against rotation on said hub arranged to move said carrier element axially to actuate the clutch and pressure means connecting said thrust member and hub to move said thrust member axially.

7. The combination of a driving shaft, a driven shaft, and clutch mechanism adapted to connect said shafts including clutch plates associated with the driving shaft, other clutch plates associated with the driven shaft, an axially movable carrier element carrying said latter clutch plates, a member fixed to said driven shaft having a hub extended outwardly beyond said carrier element and an annular flange arranged to support said clutch plates against axial movement, clutch operating mechanism including a thrust member axially movable and fixed against rotation on said hub arranged to move said carrier element axially to actuate the clutch, pressure means connecting said thrust member and hub to move said thrust member axially, and pressure adjusting means connecting said pressure means with said hub.

8. The combination of a driving shaft, a driven shaft, and clutch mechanism adapted to connect said shafts including clutch plates associated with the driving shaft, other clutch plates associated with the driven shaft, an axially movable carrier element carrying said latter clutch plates, a member fixed to said driven shaft having a hub extended outwardly beyond said carrier element and an annular flange arranged to support said clutch plates against axial movement, said hub having an external gear tooth formation, clutch operating mechanism including a thrust ring arranged to move said carrier element axially and actuate the clutch, said thrust ring having an internal gear tooth formation meshing with the external gear teeth of said hub by which it is connected for axial movement on said hub but against independent rotation with respect thereto, and pressure means connecting said hub and thrust ring to move said thrust ring axially.

9. The combination of driving and driven shafts, clutch-mechanism adapted to connect said shafts and clutch operating mechanism including an axially movable thrust ring having an internal gear tooth formation, said driven shaft having means providing an external gear tooth formation meshing with the internal gear tooth formation of said thrust ring by which said ring is free for axial movement on said shaft and connected against independent rotation with respect thereto, a ring having an internal gear tooth formation arranged to mesh with the external gear teeth of said shaft by which said ring is free for axial movement on said shaft and is connected against independent rotation with respect thereto, means to hold said ring against axial movement, and pressure means acting on said rotatably fixed and thrust rings arranged to move said thrust ring axially and actuate the clutch.

10. The combination of driving and driven shafts, clutch mechanism adapted to connect said shafts and clutch operating mechanism including a member having an external gear tooth formation, a thrust ring having an internal gear tooth formation meshing with said external gear teeth by which said ring is axially movable on said member and connected against independent rotation with respect thereto, a ring having an internal gear tooth formation arranged to mesh with the external gear teeth of said member by which said ring is free for axial movement on said member and is connected against independent rotation with respect thereto, means to hold said ring against axial movement, and pressure means acting on said fixed and thrust rings arranged to move said thrust ring axially and actuate the clutch.

11. The combination of driving and driven shafts, clutch mechanism adapted to connect said shafts, and clutch operating mechanism including a hub fixed to the driven shaft having an external gear tooth formation and an exteriorly screw-threaded portion beyond the gear teeth, a thrust ring having an internal gear tooth formation meshing with the gear teeth on said hub by which said ring is free for axial movement on said hub and connected against independent rotation with respect thereto, an adjusting nut threaded on the threaded portion of said hub, means to lock said nut to said hub including a clamping ring engaging said nut and having an internal gear tooth formation meshing with the external gear teeth of said hub, and pressure means acting on said nut and thrust ring arranged to move said thrust ring axially to actuate the clutch.

12. The combination of driving and driven shafts, clutch mechanism adapted to connect said shafts, and clutch operating mechanism including a thrust sleeve axially movable on said driven shaft to actuate the clutch, an adjusting nut adjustably rotatably carried on said shaft, means to lock said nut in adjusted position against rotation with respect to said shaft including two clamping rings disposed on opposite sides of said nut, means connecting one of said rings with said shaft against rotation with respect thereto, and means to draw said rings into holding engagement with said nut, and pressure means acting on said thrust ring and one of said clamping rings arranged to move said thrust ring axially and actuate the clutch.

13. The combination of driving and driven shafts, clutch mechanism adapted to connect said shafts, and clutch operating mechanism including a thrust sleeve axially movable on said driven shaft to actuate the clutch, an adjustable nut adjustably rotatably carried on said shaft, means to lock said nut in adjusted position against rotation with respect to said shaft including two clamping rings disposed on opposite sides of said nut, means connecting one of said rings with said shaft against rotation with respect thereto, and means to draw said rings into holding engagement with said nut, comprising pins loosely connecting said clamping rings and a clamping bolt extended between said rings, and pressure means connecting said thrust ring and said rotatably fixed clamping ring arranged to move said thrust ring axially to actuate the clutch.

14. The combination of driving and driven shafts, clutch mechanism adapted to connect said shafts, and clutch operating mechanism including a hub fixed to said driven shaft having an external gear tooth formation and an exteriorly screw-threaded portion beyond said gear teeth, a thrust ring having an internal gear tooth formation meshing with said external gear teeth on said hub by which it is free for axial movement on said hub and connected against rotation with respect thereto, an adjusting nut threaded on said screw-threaded portion of said hub, clamping rings disposed on opposite sides of said nut, one of said clamping rings having an internal gear tooth formation meshing with said external gear teeth on said hub by which it is free for axial movement thereon and fixed against rotation with respect thereto, means to draw said clamping rings against said nut including pins loosely connecting said rings and a clamping bolt connecting said rings, and pressure mechanism connecting said fixed clamping ring and said thrust ring arranged to move said thrust ring axially to actuate the clutch.

15. The combination of driving and driven shafts, an enclosing casing associated with said driving shaft, and clutch mechanism adapted to connect said shafts including an axially movable carrier element disposed within said casing, and a plurality of separate means carried by said casing extended inwardly and arranged to limit the axial movement of said carrier element.

16. The combination of driving and driven shafts, an enclosing casing associated with said driving shaft, clutch mechanism adapted to connect said shafts, said clutch mechanism including clutch plates carried by said casing, other clutch plates, an axially movable carrier element forming an end wall of said casing arranged to support said latter clutch plates, and operating mechanism arranged to move said carrier element axially to actuate the clutch.

17. The combination of driving and driven shafts, an enclosing casing associated with said driving shaft, clutch mechanism adapted to connect said shafts, said clutch mechanism including clutch plates carried by said casing, other clutch plates, an axially movable carrier element forming an end wall of said casing arranged to support said latter clutch plates, a plurality of separate means carried by said casing extended inwardly and arranged to limit the axial movement of said carrier element, and operating mechanism arranged to move said carrier element axially to actuate the clutch.

In testimony whereof, I have signed my name to this specification.

HENRY A. TUTTLE.